April 11, 1950  E. B. SQUIRE  2,503,852
VEGETABLE COMMINUTOR AND SEED SEPARATOR
Filed Sept. 14, 1946  3 Sheets-Sheet 3
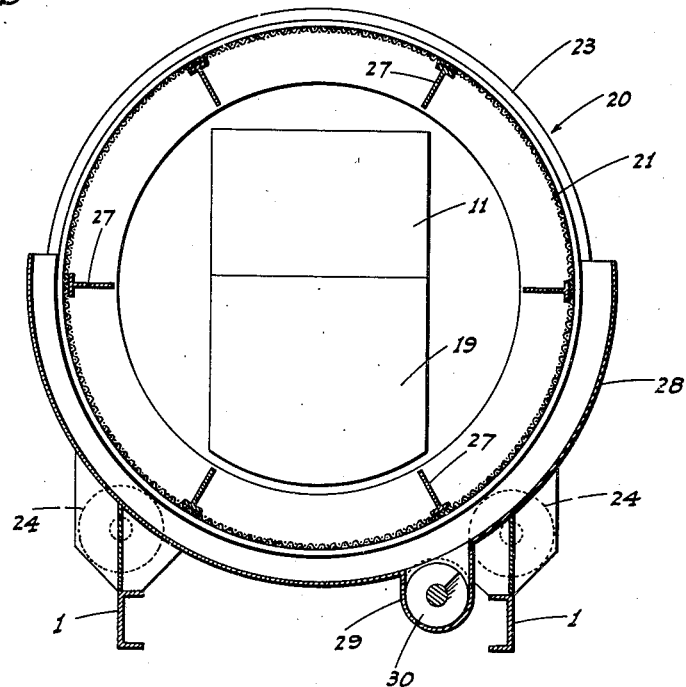
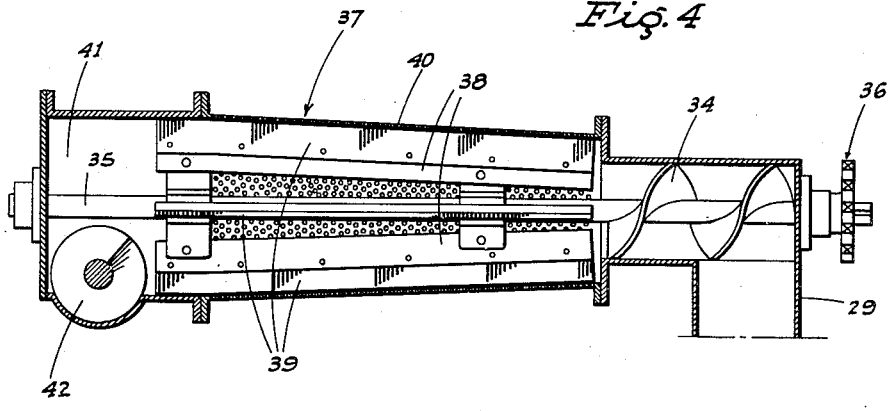
INVENTOR.
E. B. Squire
BY
ATTYS Patented Apr. 11, 1950

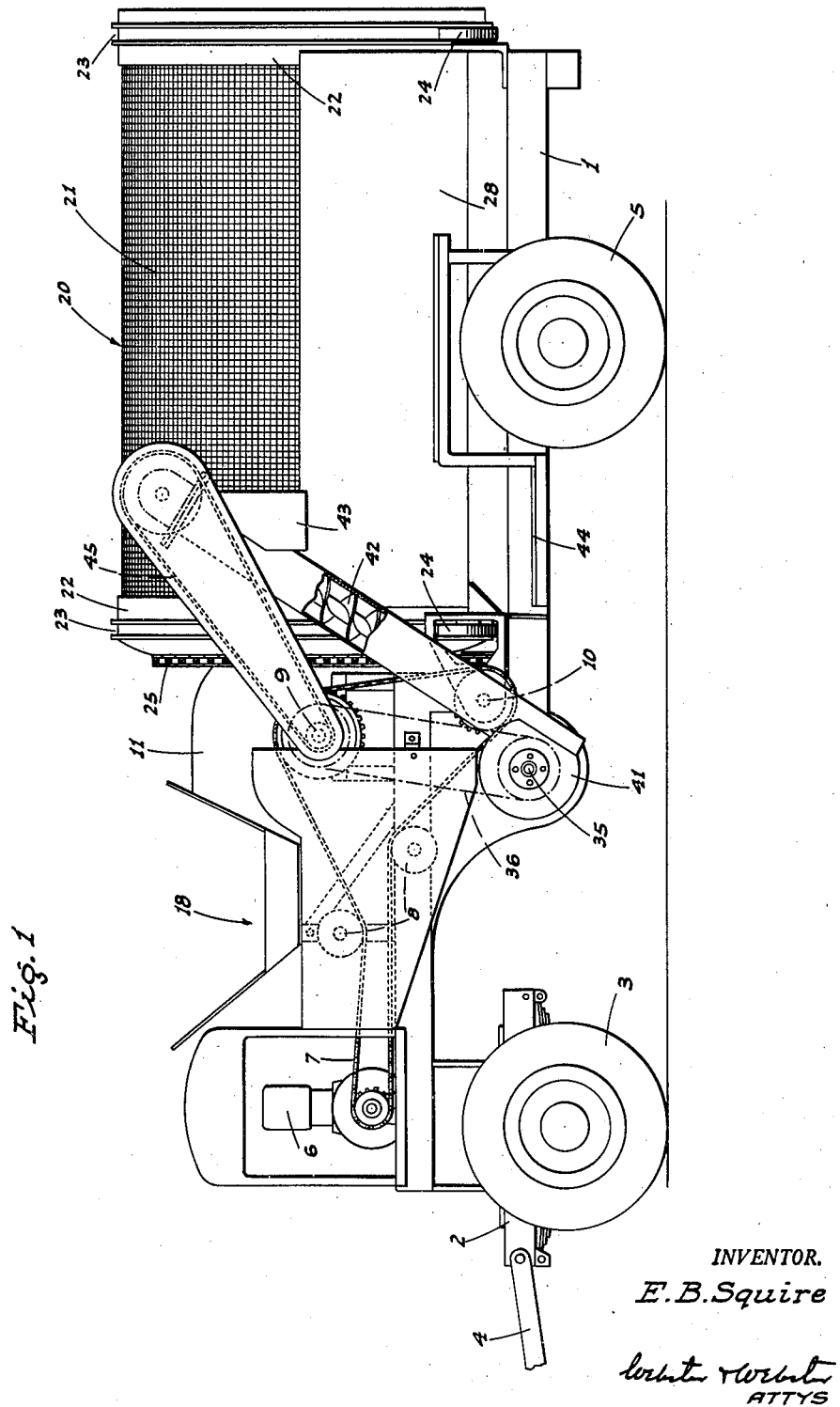

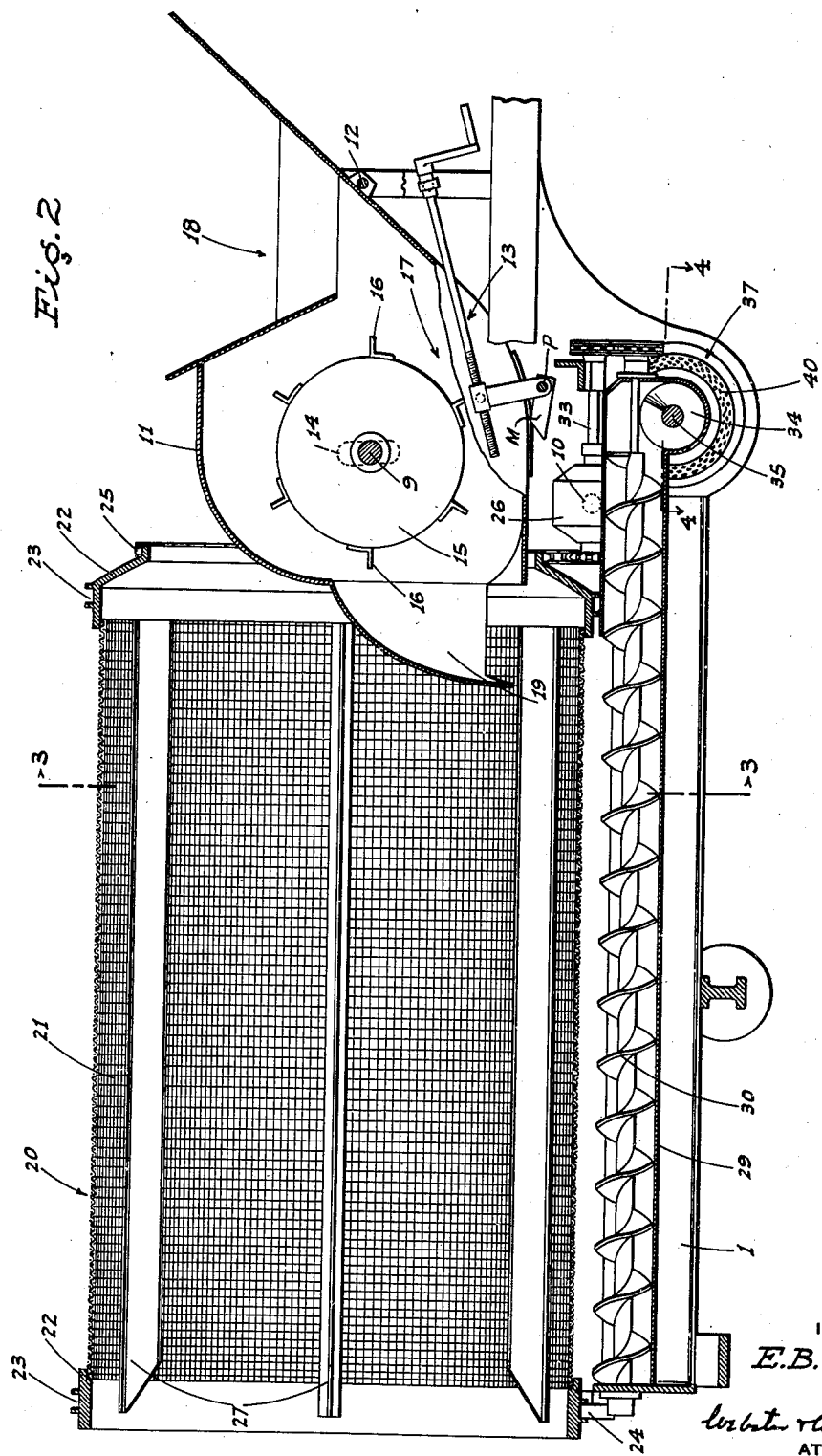

2,503,852

UNITED STATES PATENT OFFICE 2,503,852

VEGETABLE COMMINUTOR AND SEED SEPARATOR

Elisha B. Squire, Gridley, Calif.

Application September 14, 1946, Serial No. 697,076

2 Claims. (Cl. 146—76)

This invention is directed to, and it is an object to provide, an improved, power-actuated seed harvester for crops such as melons, squash, cucumbers, etc.

Another object of the invention is to provide a seed harvester, of the type described, which is operative to accomplish a high percentage of seed recovery, and to recover the seed with a minimum of pulp adherence.

A further object of the invention is to incorporate novel depulping mechanism in the harvester.

An additional object of the invention is to provide a seed harvester which is compact and simplified in structure; positive drive of the rotary parts being assured by reason of the use of roller chain and sprocket units as the driving medium.

A further object of the invention is to produce a practical device and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the improved seed harvester.

Fig. 2 is a fragmentary sectional elevation taken from the opposite side of the implement.

Fig. 3 is a fragmentary cross section on line 3—3 of Fig. 2.

Fig. 4 is a fragmentary sectional plan on line 4—4 of Fig. 2.

Referring now more particularly to the characters of reference on the drawings, the implement comprises a longitudinally extending main frame, indicated at 1, which main frame is supported, at its forward end, by a swivel truck 2 which includes transversely spaced front wheels 3 and a forwardly projecting draft tongue 4. The main frame is supported, adjacent but short of its rear end, by transversely spaced rear wheels 5.

An engine 6 is mounted on the main frame 1 at its forward end, and said engine drives an endless chain and sprocket unit 7 which extends rearwardly, in guided relation, by idlers 8, to drive a pair of vertically spaced cross shafts, indicated at 9 and 10, respectively.

The cross shaft 9 extends through an enclosed crushing housing 11; said crushing housing being pivoted, as at 12, for vertical adjustment, which adjustment is accomplished through the medium of a substantially horizontal member M under and on which the housing rests at the bottom, a frame-mounted pivot shaft P fixed with the front end of said member, and a crank-actuated adjustment screw unit 13 disposed exteriorly of the housing and applied to shaft P to turn the same so as to swing the member M up or down to correspondingly raise or lower the housing.

Vertical adjustment of the housing 11 is possible for the reason that the cross shaft 9 extends through vertically elongated slots 14 in the ends of said housing concentric to the pivotal axis 12.

Within the housing 11 the cross shaft 9 is fitted with a relatively large-diameter crushing cylinder 15, and at its periphery said crushing cylinder 15 is fitted with a plurality of circumferentially spaced, outwardly projecting bars 16 which extend lengthwise thereof.

The crop to be harvested is fed into the crushing chamber 17 formed within the housing 11 by means of a hopper 18 formed in unitary relation with said housing ahead of the crushing cylinder 15; said hopper 18 being open-ended so that it may be fed from either side of the implement. The housing 11 is set to proper clearance between the bottom of the crushing cylinder 15 and the bottom of said housing; such clearance depending on the type of crop to be harvested. The crop, such as melons, is fed through the hopper 18 into the crushing chamber 17, where it is effectively crushed by the cylinder 15 and fed rearwardly therefrom into a downwardly discharging spout 19 which projects into the forward open end of a perforate threshing cylinder or trommel, indicated generally at 20. This trommel is substantially horizontal and comprises a screen cylinder 21 supported at opposite ends by end rings 22. The end rings 22 are formed with annular channel-type tracks 23 supported on frame-mounted rollers 24. The trommel 20 is driven from its forward end by means of a ring gear and endless chain drive unit 25; such unit being in turn driven at its lower end from a gear box 26 actuated by the cross shaft 10.

Within the trommel 20 it includes a plurality of circumferentially spaced, longitudinally extending baffle plates 27 which project radially inwardly from the screen cylinder 21.

The crushed crop as fed into the trommel 20 from the spout 19 is subjected in said trommel as the latter rotates to a scrubbing and tumbling action, causing initial separation of the seeds from the pulp and rind. The pulp and rind discharge from the rear of the trommel onto the ground. The separated seeds, which are wet and include a certain amount of pulp remaining in attachment thereto, fall through the screen cylinder 21 into an upwardly opening, substantially semi-cylindrical jacket 28 in which the trommel 20 runs. From the jacket 28 the freed seeds deliver into a longitudinal trough 29 formed in the bottom of the jacket 28, and are fed forwardly in said trough by an auger conveyor 30. The auger conveyor 30 includes a forwardly projecting drive shaft 31 driven by an endless chain and sprocket unit 32 from a longitudinal countershaft 33 which leads forwardly from the gear box 26. At the forward end of the trough 29 the auger conveyor 30 delivers to a relatively short, laterally inwardly extending auger conveyor 34, including an outwardly projecting drive shaft 35 driven by an endless chain and sprocket unit 36 from the cross shaft 9 to one end thereof.

From the auger conveyor 34 the shaft 35 extends through and drives a finishing depulping unit, indicated generally at 37, and which is constructed as follows:

A plurality of circumferentially spaced paddles 38, having longitudinal rubber wiper strips 39 mounted thereon, are spider mounted on shaft 35 longitudinally thereof and run in engagement with the interior of a perforate, elongated cylinder 40 disposed concentric about said shaft 35. The cylinder tapers from the end opposite the auger conveyor 34 towards the latter; i. e. said cylinder is of gradually increasing diameter from its intake end adjacent the auger conveyor 34 to its opposite end. The longitudinal paddles 38 and rubber wiper strips 39 are disposed parallel to the walls of said perforate cylinder 40.

The seeds feed from the conveyor 34 into the perforate cylinder 40, where a further depulping and cleaning action occurs by reason of the travel of said seeds about the perforate cylinder under the influence of the paddles 38 and the rubber wiper strips 39 thereon. This removes any remaining pulp from the seeds and said pulp is forced through the perforate cylinder 40 by the strips 39 for disposal. The substantially wholly depulped seeds deliver from the cylinder 14 into an end or receiving chamber 41, and thence are picked up by an upwardly and rearwardly inclined auger-type elevator conveyor 42 which delivers into a sacking spout 43 above an operator's platform 44.

The elevator conveyor 42 is driven by an endless chain and sprocket 45 from the cross shaft 9.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a seed harvester having a supporting frame, an open-ended rotary separating trommel mounted for rotation on the frame and a driven crushing cylinder ahead of the trommel and having a shaft journaled on the frame transversely of the trommel; a housing enclosing the cylinder and formed with a feed intake hopper delivering to the cylinder, a concave cooperating with the cylinder and a discharge spout delivering into the adjacent end of the trommel, transverse pivot means mounting the housing on the frame ahead of the cylinder, the sides of the housing having arcuate slots through which the cylinder shaft projects, and exteriorly operable means to raise and lower the housing about said pivot means.

2. A structure as in claim 1 in which said last named means comprises a substantially horizontal member under and on which the housing rests by gravity, a transverse pivot shaft in the frame for said member adjacent one end thereof and hand means to control movement of said member about its pivot shaft.

ELISHA B. SQUIRE.

REFERENCES CITED

The following references are of record in the file of this patent:

UNITED STATES PATENTS

| Number | Name | Date |
|---|---|---|
| 238,859 | Cosgrove | Mar. 15, 1881 |
| 445,071 | Olsen | Jan. 20, 1891 |
| 469,026 | Hubert | Feb. 16, 1892 |
| 560,586 | Koch | May 19, 1896 |
| 685,107 | Clay | Oct. 22, 1901 |
| 741,136 | Hurst | Oct. 13, 1903 |
| 960,577 | Nichols | June 7, 1910 |
| 1,097,213 | Crine | May 19, 1914 |
| 1,550,423 | Brass | Aug. 18, 1925 |
| 1,648,341 | Goble | Nov. 8, 1927 |
| 1,709,180 | Levers | Apr. 16, 1929 |
| 2,092,102 | Wilson | Sept. 7, 1937 |